(12) United States Patent
Chen (10) Patent No.: US 8,054,267 B2
(45) Date of Patent: Nov. 8, 2011

(54) LIQUID CRYSTAL DISPLAY WITH SUB-PIXEL ZONES AND METHOD FOR DRIVING SAME

(75) Inventor: Ying Tai Chen, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 899 days.

(21) Appl. No.: 11/985,904

(22) Filed: Nov. 19, 2007

(65) Prior Publication Data

US 2008/0117348 A1    May 22, 2008

(30) Foreign Application Priority Data

Nov. 17, 2006  (CN) .......................... 2006 1 0156902

(51) Int. Cl.
    *G09G 3/36*    (2006.01)
(52) U.S. Cl. .......................................... 345/89; 345/87
(58) Field of Classification Search .................... 345/89, 345/87, 107
    See application file for complete search history.

(56) References Cited

U.S. PATENT DOCUMENTS

| 5,347,294 A | 9/1994 | Usui et al. |
| 2003/0189537 A1 | 10/2003 | Yun |
| 2003/0222840 A1 * | 12/2003 | Koga et al. ...................... 345/89 |
| 2005/0088386 A1 * | 4/2005 | Kao et al. ........................ 345/87 |

FOREIGN PATENT DOCUMENTS

| TW | 200306514 A | 11/2003 |
| TW | 200515353 A | 5/2005 |
| TW | 200617859 A | 6/2006 |

* cited by examiner

*Primary Examiner* — Quan-Zhen Wang
*Assistant Examiner* — Troy Dalrymple
(74) *Attorney, Agent, or Firm* — Altis Law Group, Inc.

(57) ABSTRACT

An LCD includes parallel scan lines, and parallel data lines orthogonal to the scan lines, to define a plurality of pixel regions. Each of the pixel regions includes a red, a green, and a blue sub-pixel region. The red sub-pixel region includes a first and a second red sub-pixel zones received scanning voltages from a same scan line and data voltage signals from different data lines. The green sub-pixel region includes a first and a second green sub-pixel zones received scanning voltages from a same scan line and data voltage signals from different data lines. The blue sub-pixel region includes a first and a second blue sub-pixel zones received scanning voltages from a same scan line and data voltage signals from different data lines. All the first and second sub-pixel zones alternately display black images or images corresponding to pre-determined gray scales during two adjacent frames of the LCD.

13 Claims, 6 Drawing Sheets

LIQUID CRYSTAL DISPLAY WITH SUB-PIXEL ZONES AND METHOD FOR DRIVING SAME

FIELD OF THE INVENTION

The present invention relates to an LCD with pixel regions divided into sub-pixel regions and sub-pixel regions divided into sub-pixel zones; such that when the LCD is driven to display images, liquid crystal molecules of liquid crystal in the LCD can twist faster over a greater range of angles. The invention also relates to a method for driving such kind of LCD.

BACKGROUND

Because LCD devices have the advantages of portability, low power consumption, and low radiation, they have been widely used in various portable information products such as notebooks, personal digital assistants (PDAs), video cameras, and the like. Furthermore, LCD devices are considered by many to have the potential to completely replace CRT (cathode ray tube) monitors and televisions.

Figure 7:
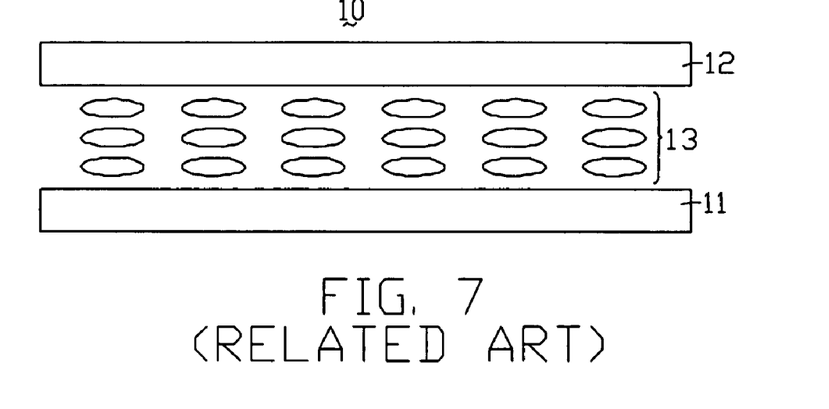
FIG. 7 is a side cross-sectional view of a conventional LCD.

FIG. 7 is a schematic, side cross-sectional view of a conventional LCD. The LCD 10 includes a TFT (thin film transistor) substrate 11, a color filter substrate 12, and a liquid crystal layer 13 interposed between the substrates 11, 12.

Figure 8:
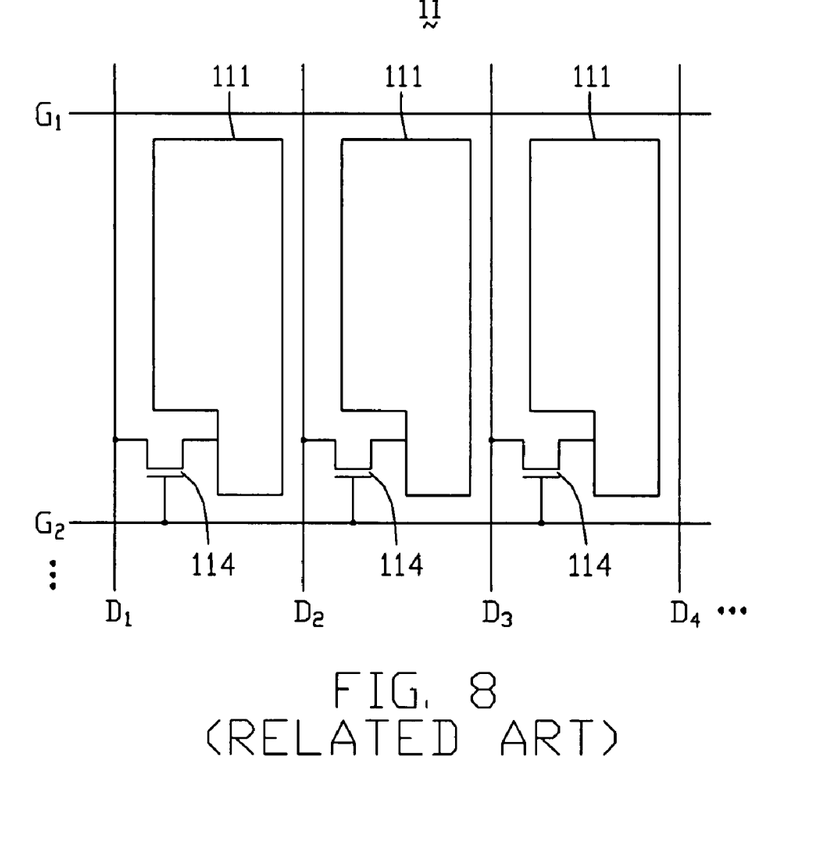
FIG. 8 is a plan view of part of a TFT substrate of the LCD of FIG. 7, showing circuitry thereof.

FIG. 8 shows an abbreviated circuit diagram of the TFT substrate 11. The TFT substrate 11 includes a plurality of rows of parallel scan lines G1, G2 . . . , and a plurality of columns of parallel data lines D1, D2, D3, D4 . . . orthogonal to the rows of parallel scan lines. The crossing scan lines and data lines define a plurality of pixel regions. Each of the pixel regions includes a pixel electrode 111 and a TFT 114. The TFT 114 is positioned near the crossing of a corresponding scan line and a corresponding data line. A gate electrode of the TFT 114 is electrically coupled to the scan line, and a source electrode of the TFT 114 is electrically coupled to the data line. Further, a drain electrode of the TFT 114 is electrically coupled to the corresponding pixel electrode 111.

Figure 9:
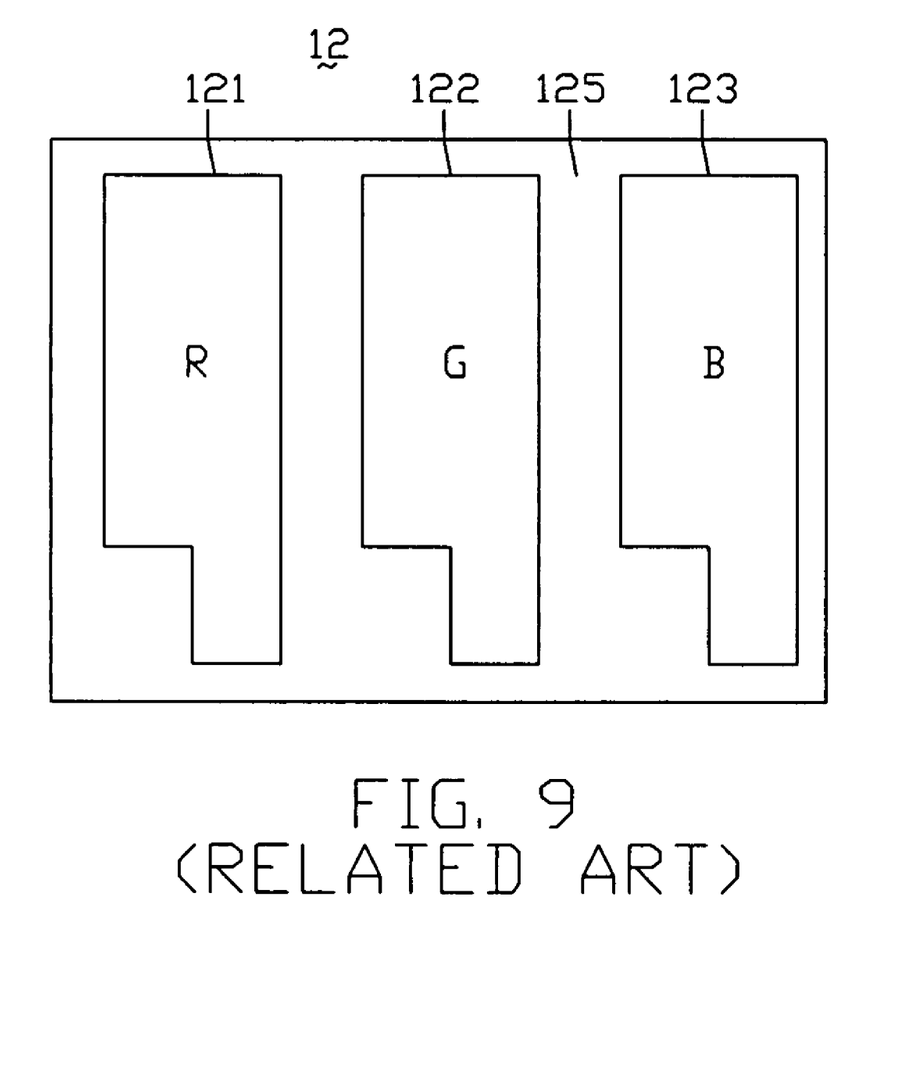
FIG. 9 is a plan view of part of a color filter substrate of the LCD of FIG. 7.

FIG. 9 shows a top plan view of parts of the color filter substrate 12. The color filter substrate 12 includes a plurality of red, green, and blue color filter units 121, 122, 123, and a black matrix 125 filled in gaps between the color filter units 121, 122, 123. Each of the color filter units 121, 122, 123 corresponds to one of the pixel electrodes 111, and has an area equal to that of the corresponding pixel electrode 111.

In operation, voltage signals are provided to the pixel electrodes 111 via the data lines, so as to control the liquid crystal molecules of the liquid crystal layer 13 to twist to a pre-determined orientation. Thereby, an exactly quantity of light passing through the color filter units 121, 122, 123 is controlled. The white light beams are converted into red, green, or blue light beams after passing through the red, green, or blue color filter units 121, 122, 123, respectively. Thus, the red, green, and blue light beams with different brightness mix together, so as to display light beams of numerous different colors.

The light beams passing through the color filter 12 may be divided into several brightness levels, which are called gray scales. The more gray scales that are defined for the LCD 10, the higher the resolution of images that can be displayed on the LCD 10. In order for the LCD 10 to display different images, the gray scale of each of the pixel regions may change, whereby the liquid crystal molecules need to twist to a pre-determined orientation according to the variation of the gray scale. The twist speed of the liquid crystal molecules is proportional to the voltage signals applied thereto, which in turn are proportional to the voltage signals provided to the pixel electrodes 111. When the image of the LCD 10 changes from a white image to a black image, the voltage signals applied to the liquid crystal molecules are the largest, whereby the liquid crystal molecules undergo the largest change in twist orientation at the fastest twist speed. In addition, when the image displayed on the LCD 10 changes in a smaller range of the gray scale, the voltage signals applied to the liquid crystal molecules are smaller, whereby the liquid crystal molecules undergo smaller changes in twist orientation at slower twist speeds.

The LCD 10 often displays colored images, and the variations of the gray scale are usually relatively small, with the voltage signals applied to the liquid crystal molecules being correspondingly small. Therefore the liquid crystal molecules are liable to twist at low speeds, whereby the LCD 10 has a low response time.

It is desired to provide an LCD and method for driving the LCD which can overcome the above-described deficiencies.

SUMMARY

An exemplary liquid crystal display includes a plurality of parallel scan lines, and a plurality of parallel data lines insulated from and orthogonal to the scan lines, the scan lines and the data lines cooperatively define a plurality of pixel regions. Each of the pixel regions includes a red sub-pixel region, a green sub-pixel region, and a blue sub-pixel region. The red sub-pixel region includes a first red sub-pixel zone and a second red sub-pixel zone, and the first and second red sub-pixel zones receive scanning voltages from a same scan line and data voltage signals from different data lines. The green sub-pixel region includes a first green sub-pixel zone and second green sub-pixel zone, and the first and second green sub-pixels receive scanning voltages from a same scan line and data voltage signals from different data lines. The blue sub-pixel region includes a first blue sub-pixel zone and second blue sub-pixel zone, and the first and second blue sub-pixels receive scanning voltages from a same scan line and data voltage signals from different data lines. During one frame period of display by the liquid crystal display, all the first red, green, and blue sub-pixel zones display black images and all the second red, green, and blue sub-pixel zones display images corresponding to pre-determined gray scales; during a next frame period of display by the liquid crystal display, all the first red, green, and blue sub-pixel zones display images corresponding to pre-determined gray scales, and all the second red, green, and blue sub-pixel zones display black images.

A method for driving a liquid crystal display is also provided. The liquid crystal display includes a plurality of parallel scan lines and a plurality of parallel data lines insulated from and orthogonal to the scan lines, the scan lines and the data lines cooperatively define a plurality of pixel regions. Each of the pixel regions includes a red sub-pixel region with a first and a second red sub-pixel zones, a green sub-pixel region with a first and a second green sub-pixel zones, and a blue sub-pixel region with a first and a second blue sub-pixel zones. The method includes: applying scanning voltages to the first and second red sub-pixel zones via a same scan line and applying data voltage signals to the first and second red sub-pixel zones via different data lines; simultaneously applying scanning voltages to the first and second green sub-pixel zones via the same scan line and applying data voltage signals to the first and second green sub-pixel zones via different data lines; simultaneously applying scanning voltages to the first and second blue sub-pixels by the same scan line and applying data voltage signals to the first and second blue sub-pixels by different data lines; wherein during one frame period of display by the liquid crystal display, all the first red, green, and blue sub-pixel zones display black images and all the second red, green, and blue sub-pixel zones display images corresponding to pre-determined gray scales; and during a next frame period of display by the liquid crystal display, all the first red, green, and blue sub-pixel zones display images corresponding to pre-determined gray scales and all the second red, green, and blue sub-pixel zones display black images.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
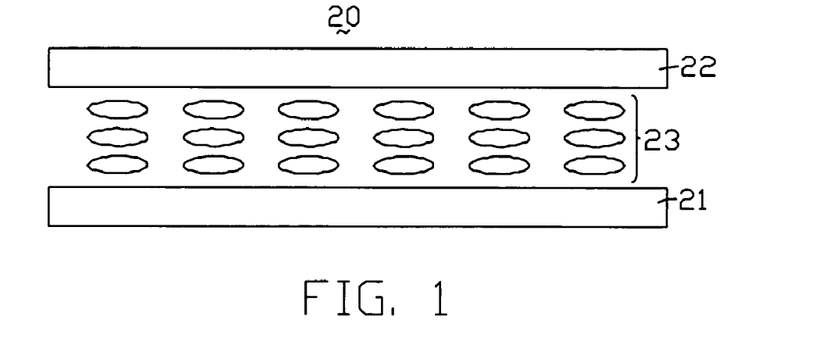
FIG. 1 is a side cross-sectional view of an LCD of an exemplary embodiment of the present invention.
Figure 2:
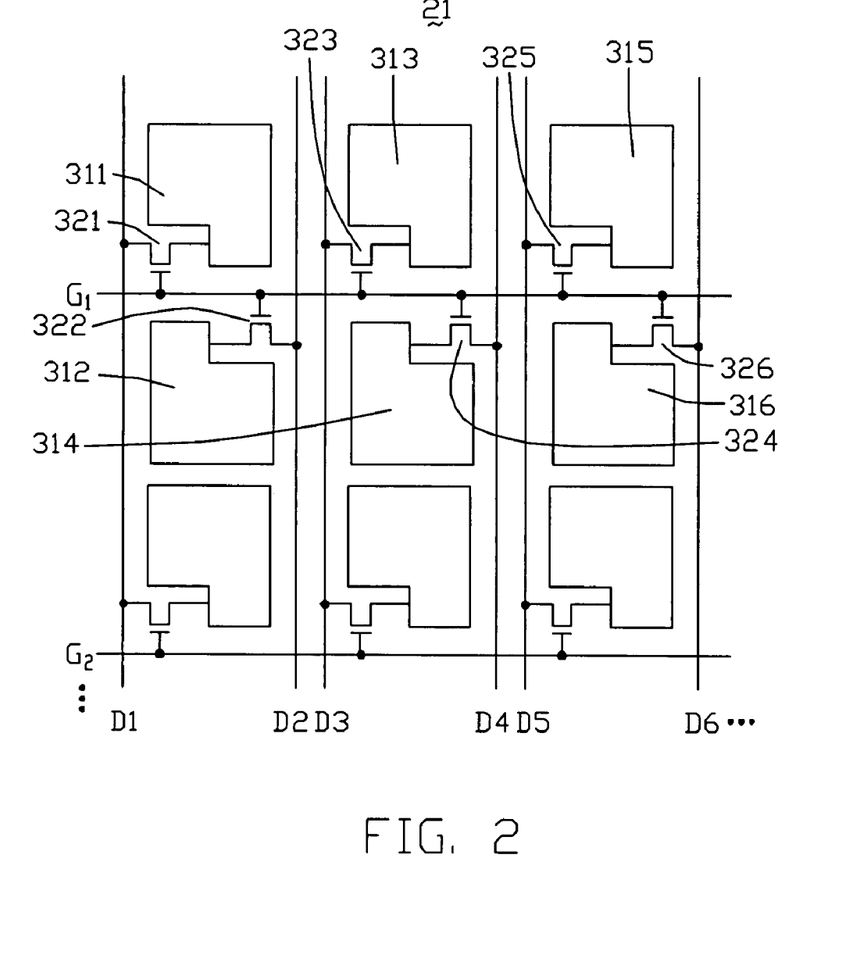
FIG. 2 is a plan view of part of a TFT substrate according to a first embodiment of the LCD of FIG. 1, showing circuitry thereof.

Referring to FIG. 1, this schematically shows an LCD of an exemplary embodiment of the present invention. The LCD 20 includes a TFT substrate 21, a color filter substrate 22, and a liquid crystal layer 23 interposed between the TFT substrate 21 and the color filter substrate 22. As shown in FIG. 2, the TFT substrate 21 includes a plurality of rows of parallel scan lines G1, G2..., a plurality of columns of parallel data lines D1, D2, D3, D4, D5, D6..., which are insulated from and orthogonal to the rows of parallel scan lines G1, G2....

In FIG. 2, the scan line G1 divides the region surrounded by the data lines D1, D2 into an upper region and a lower region. The upper region includes a first pixel electrode 311 and a first TFT 321. The first pixel electrode 311 has an area slightly less than that of the upper region. The first TFT 321 is positioned near a crossing of the scan line G1 and the data line D1. A gate electrode of the first TFT 321 is electrically coupled to the scan line G1, and a source electrode of the first TFT 321 is electrically coupled to the data line D1. Further, a drain electrode of the first TFT 321 is electrically coupled to the first pixel electrode 311. The lower region includes a second pixel electrode 312 and a second TFT 322. The second pixel electrode 312 has an area slightly less than that of the lower region. The second TFT 322 is positioned near a crossing of the scan line G1 and the data D2. A gate electrode of the second TFT 322 is electrically coupled to the scan line G1, and a source electrode of the second TFT 322 is electrically coupled to the data line D2. Further, a drain electrode of the second TFT 322 is electrically coupled to the second pixel electrode 312.

In FIG. 2, the scan line G1 divides the region surrounded by the data lines D3, D4 into an upper region and a lower region. The upper region includes a third pixel electrode 313 and a third TFT 323. The third pixel electrode 313 has an area slightly less than that of the upper region. The third TFT 323 is positioned near a crossing of the scan line G1 and the data line D3. A gate electrode of the third TFT 323 is electrically coupled to the scan line G1, and a source electrode of the third TFT 323 is electrically coupled to the data line D3. Further, a drain electrode of the third TFT 323 is electrically coupled to the third pixel electrode 313. The lower region includes a fourth pixel electrode 314 and a fourth TFT 324. The fourth pixel electrode 314 has an area slightly less than that of the lower region. The fourth TFT 324 is positioned near a crossing of the scan line G1 and the data line D4. A gate electrode of the fourth TFT 324 is electrically coupled to the scan line G1, and a source electrode of the fourth TFT 324 is electrically coupled to the data line D4. Further, a drain electrode of the fourth TFT 324 is electrically coupled to the fourth pixel electrode 314.

In FIG. 2, the scan line G1 divides the region surrounded by the data lines D5, D6 into an upper region and a lower region. The upper region includes a fifth pixel electrode 315 and a fifth TFT 325. The fifth pixel electrode 315 has an area slightly less than that of the upper region. The fifth TFT 325 is positioned near a crossing of the scan line G1 and the data line D5. A gate electrode of the fifth TFT 325 is electrically coupled to the scan line G1, and a source electrode of the fifth TFT 325 is electrically coupled to the data line D5. Further, a drain electrode of the fifth TFT 325 is electrically coupled to the fifth pixel electrode 315. The lower region includes a sixth pixel electrode 316 and a sixth TFT 326. The sixth pixel electrode 316 has an area slightly less than that of the lower region. The sixth TFT 326 is positioned near a crossing of the scan line G1 and the data line D6. A gate electrode of the sixth TFT 326 is electrically coupled to the scan line G1, and a source electrode of the sixth TFT 326 is electrically coupled to the data line D6. Further, a drain electrode of the sixth TFT 326 is electrically coupled to the sixth pixel electrode 316.

Figure 3:
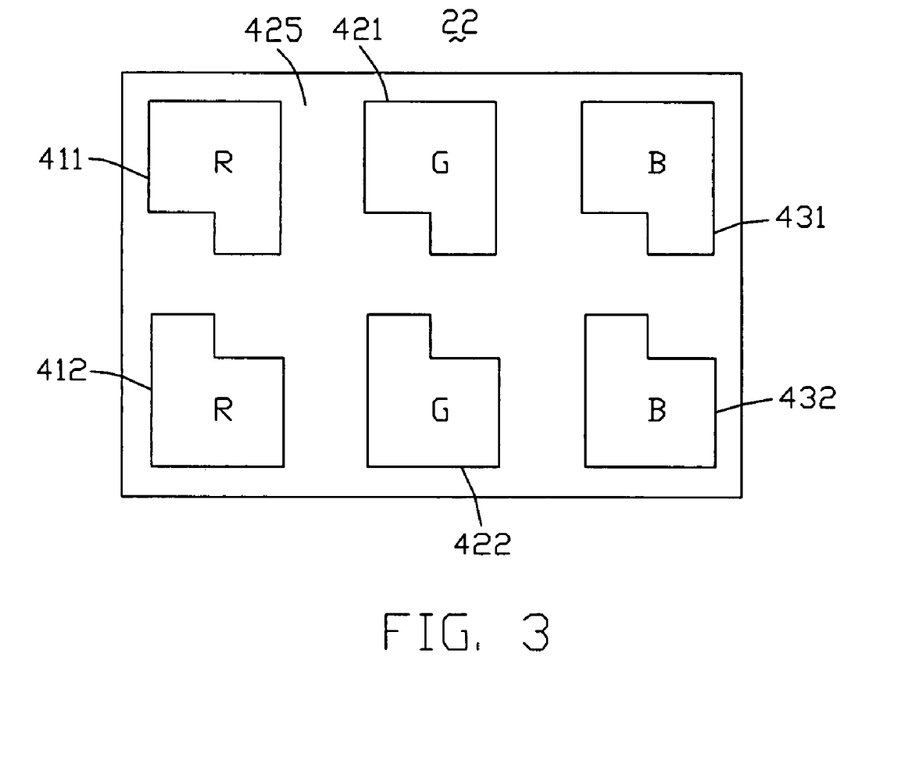
FIG. 3 is a plan view of part of a color filter substrate according to the first embodiment of the LCD of FIG. 1.

As shown in FIG. 3, the color filter substrate 22 includes a first red color filter unit 411, a second red color filter unit 412, a first green color filter unit 421, a second green color filter unit 422, a first blue color filter unit 431, a second blue color filter unit 432, and a black matrix 425 filled in the gaps between the color filter units 411, 412, 421, 422, 431, 432. The first and second red, green, and blue color filter units 411, 412, 421, 422, 431, 432 correspond to the pixel electrodes 311, 312, 313, 314, 315, 316, respectively. In particular, each of the color filter units 411, 412, 421, 422, 431, 432 has a shape similar to that of the pixel electrodes 311, 312, 313, 314, 315, 316, respectively.

The first pixel electrode 311 and the first TFT 321 of the TFT substrate 21, the first red color filter unit 411 of the color filter substrate 22, and liquid crystal molecules of the liquid crystal layer 23 contained therebetween cooperatively form a first red sub-pixel zone. The second pixel electrode 312 and the second TFT 322 of the TFT substrate 21, the second red color filter unit 412 of the color filter substrate 22, and liquid crystal molecules of the liquid crystal layer 23 contained therebetween cooperatively form a second red sub-pixel zone. The first and second red sub-pixel zones cooperatively form a red sub-pixel region.

The third pixel electrode 313 and the third TFT 323 of the TFT substrate 21, the first green color filter unit 421 of the color filter substrate 22, and liquid crystal molecules of the liquid crystal layer 23 contained therebetween cooperatively form a first green sub-pixel zone. The fourth pixel electrode 314 and the fourth TFT 324 of the TFT substrate 21, the second green color filter unit 422 of the color filter substrate 22, and liquid crystal molecules of the liquid crystal layer 23 contained therebetween cooperatively form a second green sub-pixel zone. The first and second green sub-pixel zones cooperatively form a green sub-pixel region.

The fifth pixel electrode 315 and the fifth TFT 325 of the TFT substrate 21, the first blue color filter unit 431 of the color filter substrate 22, and liquid crystal molecules of the liquid crystal layer 23 contained therebetween cooperatively form a first blue sub-pixel zone. The sixth pixel electrode 316 and the sixth TFT 326 of the TFT substrate 21, the second blue color filter unit 422 of the color filter substrate 22, and liquid crystal molecules of the liquid crystal layer 23 contained therebetween cooperatively form a second blue sub-pixel zone. The first and second blue sub-pixel zones cooperatively form a blue sub-pixel region.

The red, green, and blue sub-pixel regions cooperatively form a pixel region, and the pixel region corresponds to a point on a screen of the LCD 20 that is viewed by a user.

Figure 4:
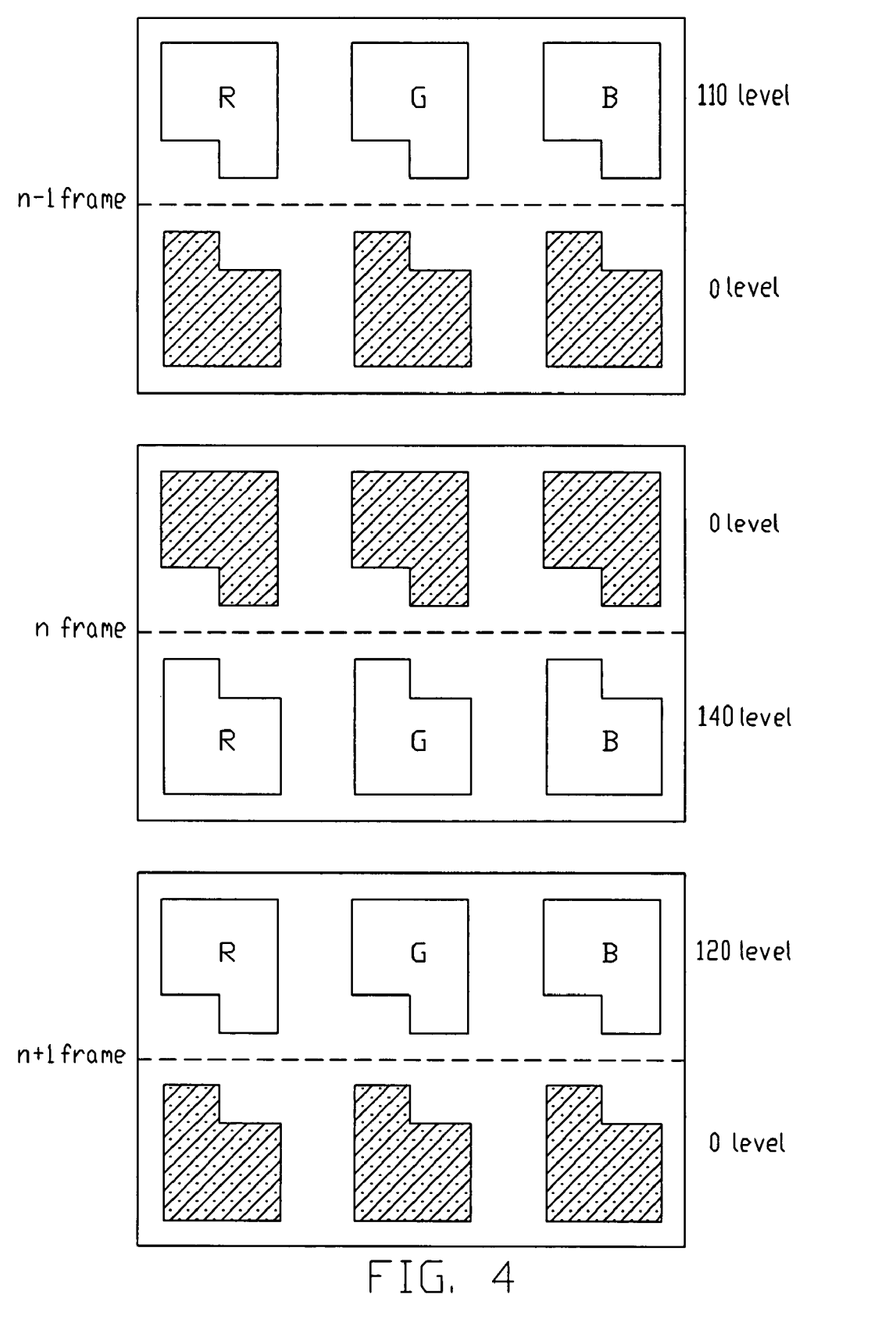
FIG. 4 is a three-part chart illustrating exemplary driving of the TFT substrate of FIG. 2 during three frame periods ("frames").

FIG. 4 is a three-part chart illustrating exemplary driving of the TFT substrate 21 during three frame periods ("frames"). In operation, during an (n−1)th frame, a scanning voltage is supplied to the gate line G1 to turn on the TFTs 321, 322, 323, 324, 325, 326, and then data voltage signals corresponding to a pre-determined gray scale, such as a gray scale of 110 level, are supplied to the data lines D1, D3, D5, respectively. At the same time, data voltage signals corresponding to black images, such as a gray scale of 0 level, are supplied to the data lines D2, D4, D6, respectively. That is, the first red, green, and blue sub-pixel zones display images corresponding to pre-determined gray scales, and the second red, green, and blue sub-pixel zones display black images. The pixel region formed by the sub-pixel zones generates a point of light with a pre-determined color that is viewed by the user.

During an nth frame, a scanning voltage is supplied to the gate line G1 to turn on the TFTs 321~326, and then data voltage signals corresponding to black images, such as a gray scale of 0 level, are supplied to the data lines D1, D3, D5, respectively. At the same time, data voltage signals corresponding to a pre-determined gray scale, such as a gray scale of 140 level, are supplied to the data lines D2, D4, D6, respectively. That is, the first red, green, and blue sub-pixel zones display black images, and the second red, green, and blue sub-pixel zones display images corresponding to pre-determined gray scales. The pixel region formed by the sub-pixel zones generates a point of light with a pre-determined color that is viewed by the user.

During an (n+1)th frame, a scanning voltage is supplied to the gate line G1 to turn on the TFTs 321~326, and then data voltage signals corresponding to a pre-determined gray scale, such as a gray scale of 120 level, are supplied to the data lines D1, D3, D5, respectively. At the same time, data voltage signals corresponding to black images, such as a gray scale of 0 level, are supplied to the data lines D2, D4, D6, respectively. That is, the first red, green, and blue sub-pixel zones display images corresponding to pre-determined gray scales, and the second red, green, and blue sub-pixel zones display black images. The pixel region formed by the sub-pixel zones generates a point of light with a pre-determined color that is viewed by the user.

According to the operational processes described above, the method for driving the LCD 20 may be summarized as follows. During one of the frames, all the first red, green, and blue sub-pixel zones of the LCD 20 display black images, and all the second red, green, and blue sub-pixel zones of the LCD 20 display images corresponding to pre-determined gray scales; and during the next frame, all the first red, green, and blue sub-pixel zones of the LCD 20 display images corresponding to pre-determined gray scales, and all the second red, green, and blue sub-pixel zones of the LCD 20 display black images.

Unlike with the above-described conventional LCD 10, in operation of the LCD 20, all the sub-pixel zones always change from a gray scale of 0 level to a gray scale of a pre-determined level, or from a gray scale of a pre-determined level to a gray scale of 0 level. That is, the liquid crystal molecules always undergo a large change in twist orientation, and larger voltage signals need to be provided to drive such changes. Therefore the liquid crystal molecules have a faster twist speed, so that the response time of the LCD 20 is improved.

Figure 5:
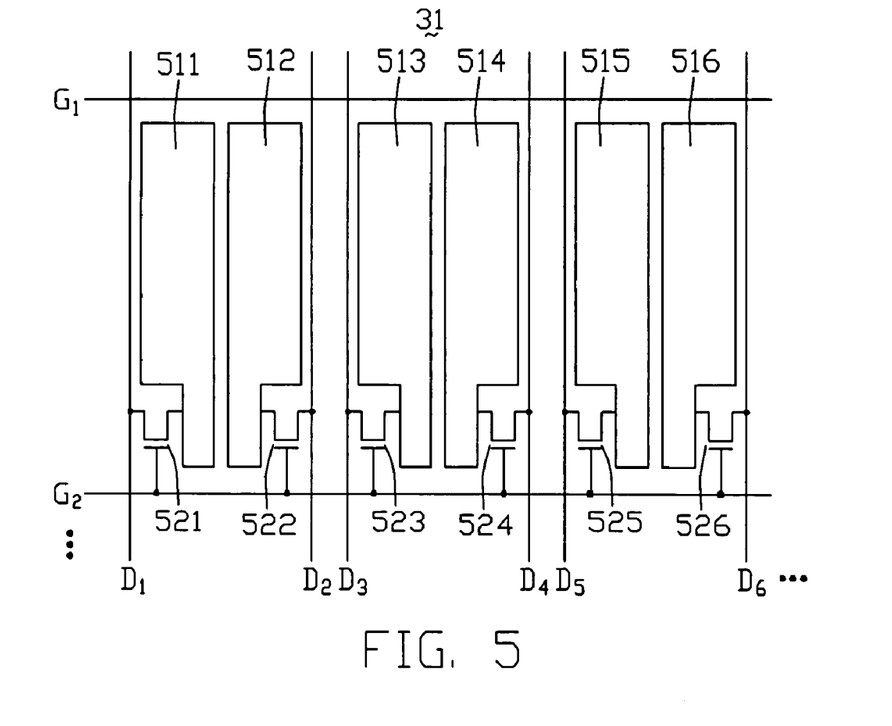
FIG. 5 is a plan view of part of a TFT substrate according to a second embodiment of the LCD of FIG. 1, showing circuitry thereof.
Figure 6:
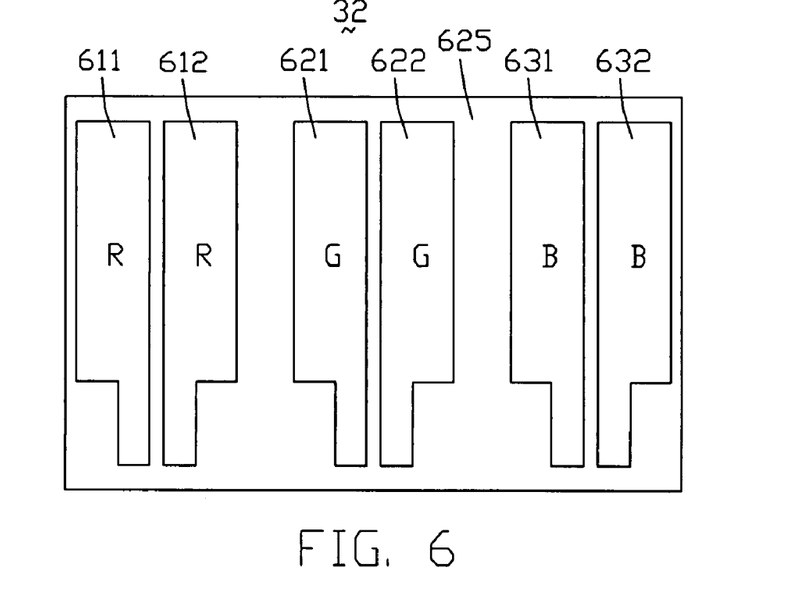
FIG. 6 is a plan view of part of a color filter substrate according to the second embodiment of the LCD of FIG. 1.

Various modifications and alterations related to the above-described embodiments are possible. For example, FIG. 5 is a plan view of part of a TFT substrate 31 according to a second embodiment of the LCD 20, showing circuitry thereof. FIG. 6 is a plan view of part of a color filter substrate 32 according to the second embodiment.

In FIG. 5, a region surrounded by the scan lines G1, G2 and the data lines D1, D2 includes a first and a second pixel electrodes 511, 512, and a first and a second TFTs 521, 522. Each of the first and second pixel electrodes 511, 512 has an area slightly less than half of that of the region. The first TFT 521 is positioned near a crossing of the scan line G2 and the data line D1. A gate electrode of the first TFT 521 is electrically coupled to the scan line G2, and a source electrode of the first TFT 521 is electrically coupled to the data line D1. Further, a drain electrode of the first TFT 521 is electrically coupled to the first pixel electrode 511. The second TFT 522 is positioned near a crossing of the scan line G2 and the data line D2. A gate electrode of the second TFT 522 is electrically coupled to the scan line G2, and a source electrode of the second TFT 522 is electrically coupled to the data line D2. Further, a drain electrode of the second TFT 522 is electrically coupled to the second pixel electrode 512.

In FIG. 5, a region surrounded by the scan lines G1, G2 and the data lines D3, D4 includes a third and a fourth pixel electrodes 513, 514, and a third and a fourth TFTs 523, 524. Each of the third and fourth pixel electrodes 513, 514 has an area slightly less than half of that of the region. The third TFT 523 is positioned near a crossing of the scan line G2 and the data line D3. A gate electrode of the third TFT 523 is electrically coupled to the scan line G2, and a source electrode of the third TFT 523 is electrically coupled to the data line D3. Further, a drain electrode of the third TFT 523 is electrically coupled to the third pixel electrode 513. The fourth TFT 524 is positioned near a crossing of the scan line G2 and the data line D4. A gate electrode of the fourth TFT 524 is electrically coupled to the scan line G2, and a source electrode of the fourth TFT 524 is electrically coupled to the data line D4. Further, a drain electrode of the fourth TFT 524 is electrically coupled to the fourth pixel electrode 514.

In FIG. 5, a region surrounded by the scan lines G1, G2 and the data lines D5, D6 includes a fifth and a sixth pixel electrodes 515, 516, and a fifth and a sixth TFTs 525, 526. Each of the fifth and sixth pixel electrodes 515, 516 has an area slightly less than half of that of the region. The fifth TFT 525 is positioned near a crossing of the scan line G2 and the data line D5. A gate electrode of the fifth TFT 525 is electrically coupled to the scan line G2, and a source electrode of the fifth TFT 525 is electrically coupled to the data line D5. Further, a drain electrode of the fifth TFT 525 is electrically coupled to the fifth pixel electrode 515. The sixth TFT 526 is positioned near a crossing of the scan line G2 and the data line D6. A gate electrode of the sixth TFT 526 is electrically coupled to the scan line G2, and a source electrode of the sixth TFT 526 is electrically coupled to the data line D6. Further, a drain electrode of the sixth TFT 526 is electrically coupled to the sixth pixel electrode 516.

The color filter substrate 32 includes a first red color filter unit 611, a second red color filter unit 612, a first green color filter unit 621, a second green color filter unit 622, a first blue color filter unit 631, a second blue color filter unit 632, and a black matrix 625 filled in the gaps between the color filter units 611, 612, 621, 622, 631, 632. The first and second red, green, and blue color filter units 611, 612, 621, 622, 631, 632 correspond to the pixel electrodes 511, 512, 513, 514, 515, 516, respectively. In particular, each of the color filter units 611, 612, 621, 622, 631, 632 has a shape similar to that of the pixel electrodes 511, 512, 513, 514, 515, 516, respectively.

It is to be further understood that even though numerous characteristics and advantages of preferred and exemplary embodiments have been set out in the foregoing description, together with details of the structures and functions associated with the embodiments, the disclosure is illustrative only; and changes may be made in detail (including in matters of shape, size, and arrangement of parts) within the principles of the invention to the full extent indicated by the broad general meaning of the terms in which the appended claims are expressed.

What is claimed is:

1. A liquid crystal display, comprising:
  a plurality of parallel scan lines; and
  a plurality of parallel data lines insulated from and orthogonal to the scan lines, the scan lines and the data lines cooperatively defining a plurality of pixel regions;
  wherein each of the pixel regions includes a red sub-pixel region, a green sub-pixel region, and a blue sub-pixel region;
  the red sub-pixel region includes a first red sub-pixel zone and a second red sub-pixel zone, and the first and second red sub-pixel zones receive scanning voltages from a same scan line and data voltage signals from different data lines;
  the green sub-pixel region includes a first green sub-pixel zone and a second green sub-pixel zone, and the first and second green sub-pixel zones receive scanning voltages from a same scan line and data voltage signals from different data lines;
  the blue sub-pixel region includes a first blue sub-pixel zone and a second blue sub-pixel zone, and the first and second blue sub-pixel zones receive scanning voltages from a same scan line and data voltage signals from different data lines;
  wherein during one frame period of display by the liquid crystal display, all the first red, green, and blue sub-pixel zones display black images, and all the second red, green, and blue sub-pixel zones display images corresponding to pre-determined gray scales; and
  during a next frame period of display by the liquid crystal display, all the first red, green, and blue sub-pixel zones display images corresponding to pre-determined gray scales, and all the second red, green, and blue sub-pixel zones display black images;
  wherein each of the first and second red sub-pixel zones includes a pixel electrode, a thin film transistor, and a red color filter unit, respectively; each of the second green sub-pixel zones includes a pixel electrode, a thin film transistor, and a green color filter unit, respectively; each of the first and second blue sub-pixel zones includes a pixel electrode, a thin film transistor, and a blue color filter unit, respectively;
  wherein the first and second red sub-pixel zones are positioned at a same side of the scan line that are electrically coupled thereto, the first and second green sub-pixel zones are positioned at a same side of the scan line that are electrically coupled thereto, and the first and second blue sub-pixel zones are positioned at a same side of the scan line that are electrically coupled thereto.

2. The liquid crystal display as claimed in claim 1, wherein each of the red, green, and blue color filter units has a shape equal to the corresponding pixel electrode.

3. The liquid crystal display as claimed in claim 1, wherein each of the thin film transistors of the first and second red sub-pixel zones includes a gate electrode electrically coupled to the same scan line, a source electrode electrically coupled to the different data lines, and a drain electrode electrically coupled to the corresponding pixel electrode.

4. The liquid crystal display as claimed in claim 1, wherein each of the thin film transistors of the first and second green sub-pixel zones includes a gate electrode electrically coupled to the same scan line, a source electrode electrically coupled to the different data lines, and a drain electrode electrically coupled to the corresponding pixel electrode.

5. The liquid crystal display as claimed in claim 1, wherein each of the thin film transistors of the first and second blue sub-pixel zones includes a gate electrode electrically coupled to the same scan line, a source electrode electrically coupled to the different data lines, and a drain electrode electrically coupled to the corresponding pixel electrode.

6. A display, comprising:
  a plurality of scan lines;
  a plurality of data lines;
  a plurality of pixel regions, each of the pixel regions including a red sub-pixel region, a green sub-pixel region, and a blue sub-pixel region, the red sub-pixel region including a first red sub-pixel zone and a second red sub-pixel zone, with the first and second red sub-pixel zones coupling to a same scan line and different data lines, the green sub-pixel region including a first green sub-pixel zone and a second green sub-pixel zone, with the first and second green sub-pixel zones coupling to a same scan line and different data lines; the blue sub-pixel region including a first blue sub-pixel zone and a second blue sub-pixel zone, with the first and second blue sub-pixel zones coupling to a same scan line and different data lines;
  wherein during a frame period of display by the liquid crystal display, all the first red, green, and blue sub-pixel zones are applied with black image data via one portion of the plurality of data lines, and all the second red, green, and blue sub-pixel zones are applied with actual image data via the other portion of the plurality of data lines, and during a next frame period of display by the liquid crystal display, all the first red, green, and blue sub-pixel zones are applied with the actual image data via the one portion of the plurality of data lines, and all the second red, green, and blue sub-pixel zones are applied with data image data via the other portion of the plurality of data lines.

7. The display as claimed in claim 6, wherein the first and second red sub-pixel zones are positioned at a same side of the scan line that is electrically coupled to the first and second red sub-pixel zones, the first and second green sub-pixel zones are positioned at a same side of the scan line that is electrically coupled to the first and second green sub-pixel zones, and the first and second blue sub-pixel zones are positioned at a same side of the scan line that is electrically coupled to the first and second blue sub-pixel zones.

8. The display as claimed in claim 6, wherein each of the first and second red sub-pixel zones includes a pixel electrode, a thin film transistor, and a red color filter unit, respectively; each of the second green sub-pixel zones includes a pixel electrode, a thin film transistor, and a green color filter unit, respectively; each of the first and second blue sub-pixel zones includes a pixel electrode, a thin film transistor, and a blue color filter unit, respectively.

9. A display, comprising:
a plurality of scan lines;
a plurality data line pairs, each pair comprising a first data line and a second data line;
a plurality of pixel regions, each of the pixel regions comprising a red sub-pixel region, a green sub-pixel region, and a blue sub-pixel region,
the red sub-pixel region coupled to a scan line and a corresponding data line pair, the red sub-pixel region comprising a first red sub-pixel zone and a second red sub-pixel zone, the first and second red sub-pixel zones coupled to a same scan line and different data lines in the corresponding data line pair,
the green sub-pixel region coupled to a scan line and a corresponding data line pair, the green sub-pixel region comprising a first green sub-pixel zone and a second green sub-pixel zone, the first and second green sub-pixel zones coupled to a same scan line and different data lines in the corresponding data line pair;
the blue sub-pixel region coupled to a scan line and a corresponding data line pair, the blue sub-pixel region comprising a first blue sub-pixel zone and a second blue sub-pixel zone, the first and second blue sub-pixel zones coupled to a same scan line and different data lines in the corresponding data line pair;
wherein, during a frame period of display, the first data lines of the plurality data line pairs are applied with first data signals corresponding to black images, and the second data lines of the plurality data line pairs are applied with second data signals corresponding to actual images; during a next frame period of display, the first data lines of the plurality data line pairs are applied with the second data signals corresponding to the actual images, and the second data lines of the plurality data line pairs are applied with the first data signals corresponding to the black images.

10. The display as claimed in claim 9, wherein the second data signals corresponds to pre-determined gray scales.

11. The display as claimed in claim 10, wherein each of the first and second red sub-pixel zones includes a pixel electrode, a thin film transistor, and a red color filter unit, respectively; each of the second green sub-pixel zones includes a pixel electrode, a thin film transistor, and a green color filter unit, respectively; each of the first and second blue sub-pixel zones includes a pixel electrode, a thin film transistor, and a blue color filter unit, respectively.

12. The display as claimed in claim 11, wherein the first and second red sub-pixel zones are positioned at a same side of the scan line that is electrically coupled to the first and second red sub-pixel zones, the first and second green sub-pixel zones are positioned at a same side of the scan line that is electrically coupled to the first and second green sub-pixel zones, and the first and second blue sub-pixel zones are positioned at a same side of the scan line that is electrically coupled to the first and second blue sub-pixel zones.

13. The display as claimed in claim 11, wherein the first and second red sub-pixel zones are positioned at different sides of the scan line that is electrically coupled to the first and second red sub-pixel zones, the first and second green sub-pixel zones are positioned at different sides of the scan line that is electrically coupled to the first and second green sub-pixel zones, and the first and second blue sub-pixel zones are positioned at different sides of the scan line that is electrically coupled to the first and second blue sub-pixel zones.

* * * * *